United States Patent [19]

Midgley

[11] 4,175,541

[45] Nov. 27, 1979

[54] SOLAR HEATING SYSTEM

[76] Inventor: Calvert H. Midgley, 2200 Gravenstein Hwy., Sebastapol, Calif. 95472

[21] Appl. No.: 851,102

[22] Filed: Nov. 14, 1977

[51] Int. Cl.² .............................................. F24J 3/02
[52] U.S. Cl. .................................... 126/429; 126/442; 237/1 A; 126/400; 165/179
[58] Field of Search ........................ 126/270, 271, 400; 237/1 A; 165/179

[56] References Cited

U.S. PATENT DOCUMENTS

| | | | |
|---|---|---|---|
| 2,294,137 | 8/1942 | Spofford | 165/179 X |
| 3,311,165 | 3/1967 | Karmazin | 165/179 X |
| 3,875,925 | 4/1975 | Johnston | 126/270 |
| 3,894,685 | 7/1975 | Keyes et al. | 237/1 A |
| 4,059,226 | 11/1977 | Atkinson | 126/400 |
| 4,088,115 | 5/1978 | Powell | 237/1 A |
| 4,088,266 | 5/1978 | Keyes | 237/1 A |
| 4,094,300 | 6/1978 | Young | 126/271 |

*Primary Examiner*—Samuel Scott
*Assistant Examiner*—Larry Jones

[57] ABSTRACT

A solar heating system comprising a collector panel with a plurality of beverage cans or the like received in holes drilled therethrough. The surfaces of the panel and the cans protruding from the front of the panel are painted with a dark, heat-absorbing paint and the circular tops of the cans, which are exposed through the other side of the panel, are left uncoated to radiate heat directly into a heat storage medium, such as a pile of rocks on the other side. A heating duct exits from the top of the heat storage chamber to the area to be heated and the return duct enters at the same level. Circulation of air through the heating duct is mechanically induced.

4 Claims, 5 Drawing Figures

SOLAR HEATING SYSTEM

BACKGROUND OF THE INVENTION

At the present time when sources of fuel are becoming more limited and costly, intensive efforts are being made to utilize solar energy as a heating medium. Systems presently available enable conservation of fuel, but the systems themselves have proven to be extremely costly and generally constitute a major investment for the building owner.

OBJECTS OF THE INVENTION

It is an object of this invention to provide a solar heating system which is relatively inexpensive to manufacture.

It is a further object of this invention to provide a solar heating system which may be manufactured by the homeowner from materials readily available.

It is a further object of this invention to provide a solar heating system which is simple to manufacture and efficient in operation.

Other objects and advantages of this invention will become apparent from the description to follow, particularly when read in conjunction with the accompanying drawings.

SUMMARY OF THE INVENTION

In carrying out this invention, there is provided an enclosure with the front side angled to catch the sun's rays. The front panel has parallel sheets of a transparent material, such as glass or plastic, which enable the rays to pass but, having an insulating air space between them resist outward transmission of heat. Just behind the transparent panels is a collector panel having a plurality of holes through it receiving a quantity of metallic cylinders, such as beverage cans. The top with pull tab removed extends through the holes and the outer surface of the collector panels as well as the outwardly exposed surfaces of the upstanding cans are painted a dark, heat-absorbing paint, whereby the cans will absorb heat and radiate it directly into a heat storage medium, such as a pile of rocks disposed in a heat storage chamber at the other side of the collector panel. Openings at the bottom and top of the collector panel enable natural circulation of air from the lower portion of the heat storage chamber through the bottom opening to the front of the collector panel, and then up over the collector panel to enter back into the heat storage chamber at the top. A hot air duct exits from the top of the storage chamber and warm air is drawn through by a fan and projected in the room to be heated. Return air enters each storage chamber at the same level that the heated air exits to that there is no natural circulation when the fan is not in operation. During circulation return air is ducted downward to the bottom of the heat storage chamber where it is exited to be heated again. If desired a water line may also extend across the heat chamber at a slight incline to be heated and circulate naturally.

DESCRIPTION OF A PREFERRED EMBODIMENT

Figure 1:
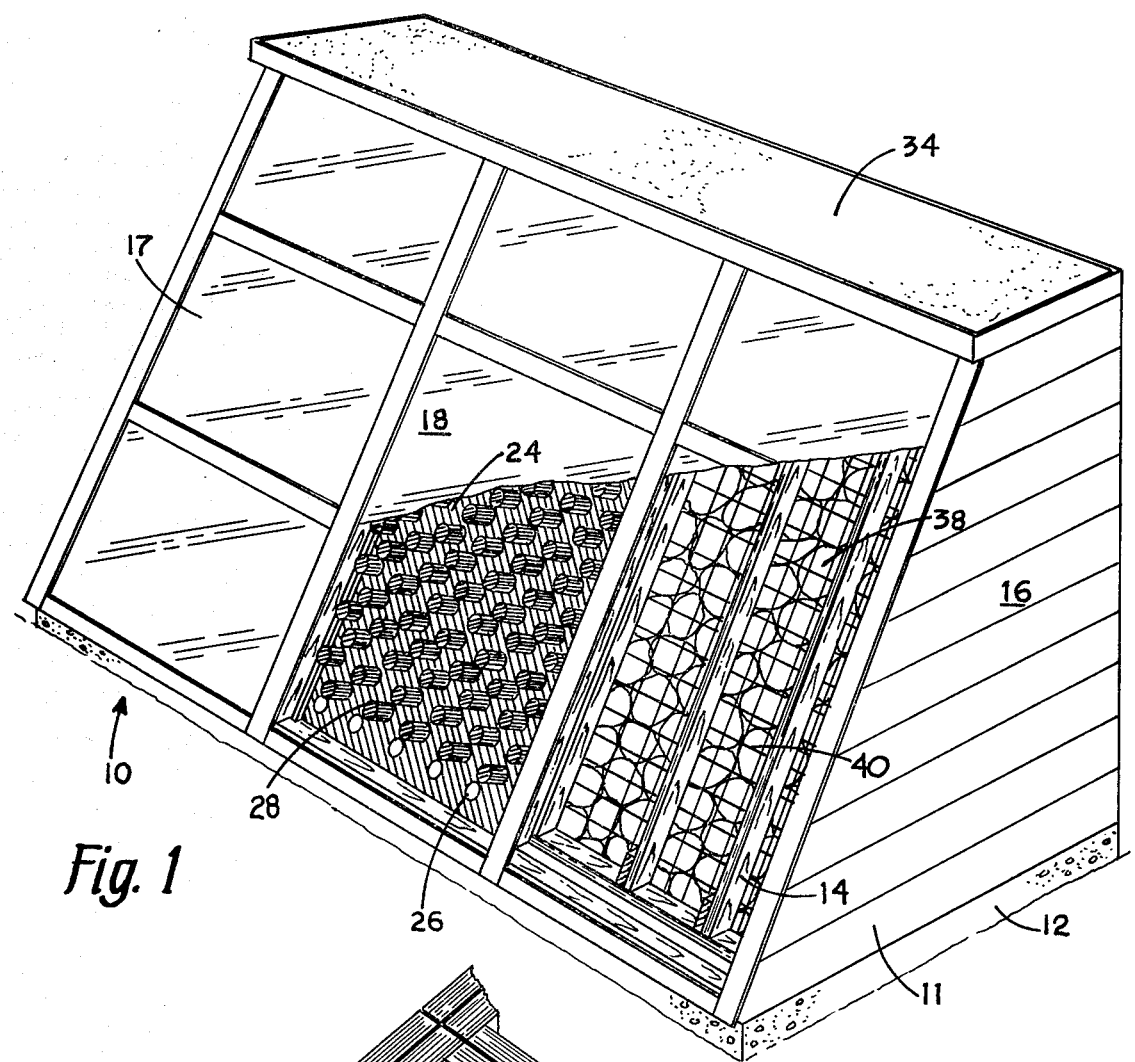
FIG. 1 is an isometric view partially broken away of a solar heating housing embodying features of this invention.
Figure 2:
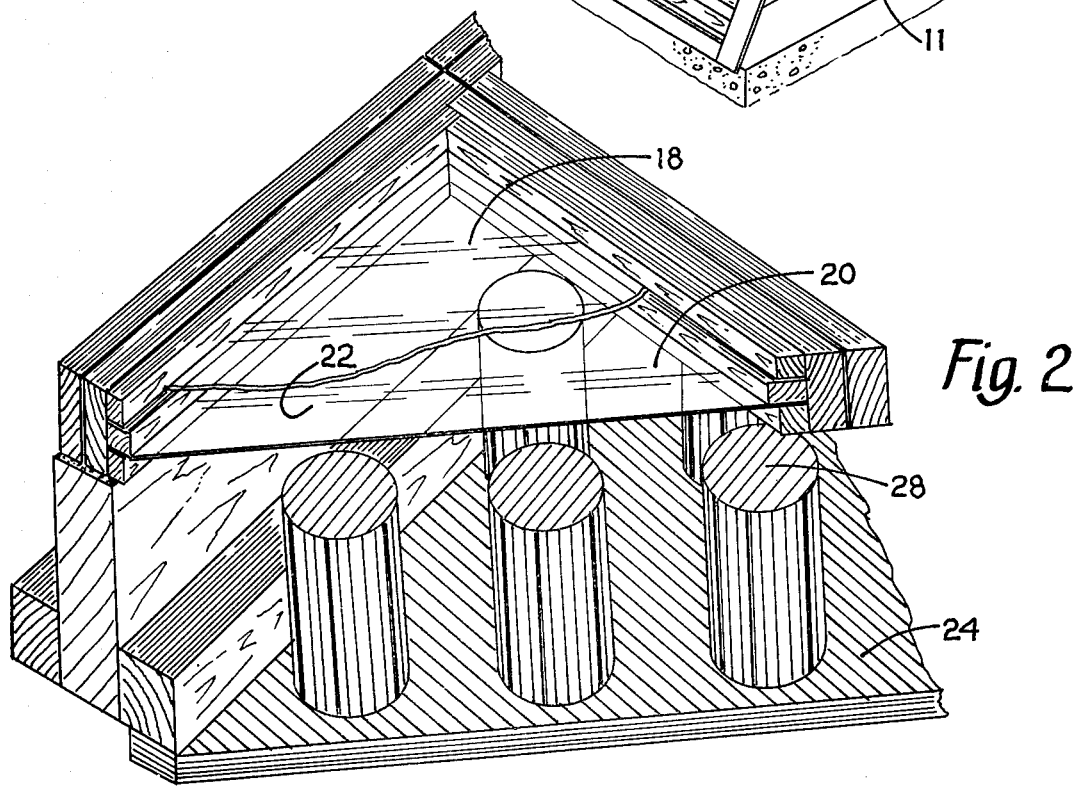
FIG. 2 is a partial isometric view of the solar collector panel.

Referring now to FIG. 1 with greater particularity, the solar heating system 10 of this invention includes a housing 11 on a foundation or slab 12 supporting framing 14 of suitable lumber, such as conventional 2×4's. Side panels 16 of wood or metal may be generally trapezoidal in configuration to provide a front panel 17 which slopes so as to be more nearly perpendicular to the rays of the sun.

Figure 4:
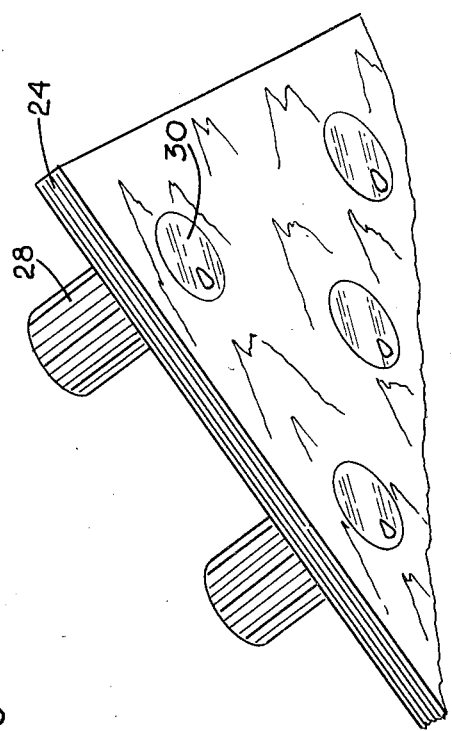
FIG. 4 is a partial isometric view of the underside of the collector panel.

The front panel 17 comprises a double transparent wall made up of spaced parallel sheets 18 and 20 of glass or a clear plastic, providing an insulating space 22 between them. Hence the sun's rays may pass freely through the glass panels 18 and 20 to heat a surface upon which they impinge but, with the insulating space 22 between the transparent sheets, the heat so generated cannot move back out and is retained within the housing. Mounted behind the transparent panels 18 and 20, is the collector panel 24 through which a multiplicity of circular holes 26 have been drilled. Fitted into most of the holes 26 are conventional beverage cans 28, so that the tops of the cans 30 (FIG. 4) with pull tabs removed are exposed through the collector panel 24. The exposed outer surface of the collector panel 24, as well as the exposed outer surfaces of the cans 28 are coated with a dark paint to maximize their heat absorbing characteristics, while the tops of the cans 30, are uncoated to provide reflective radiating surfaces exposed through the collector panel 24.

Figure 3:
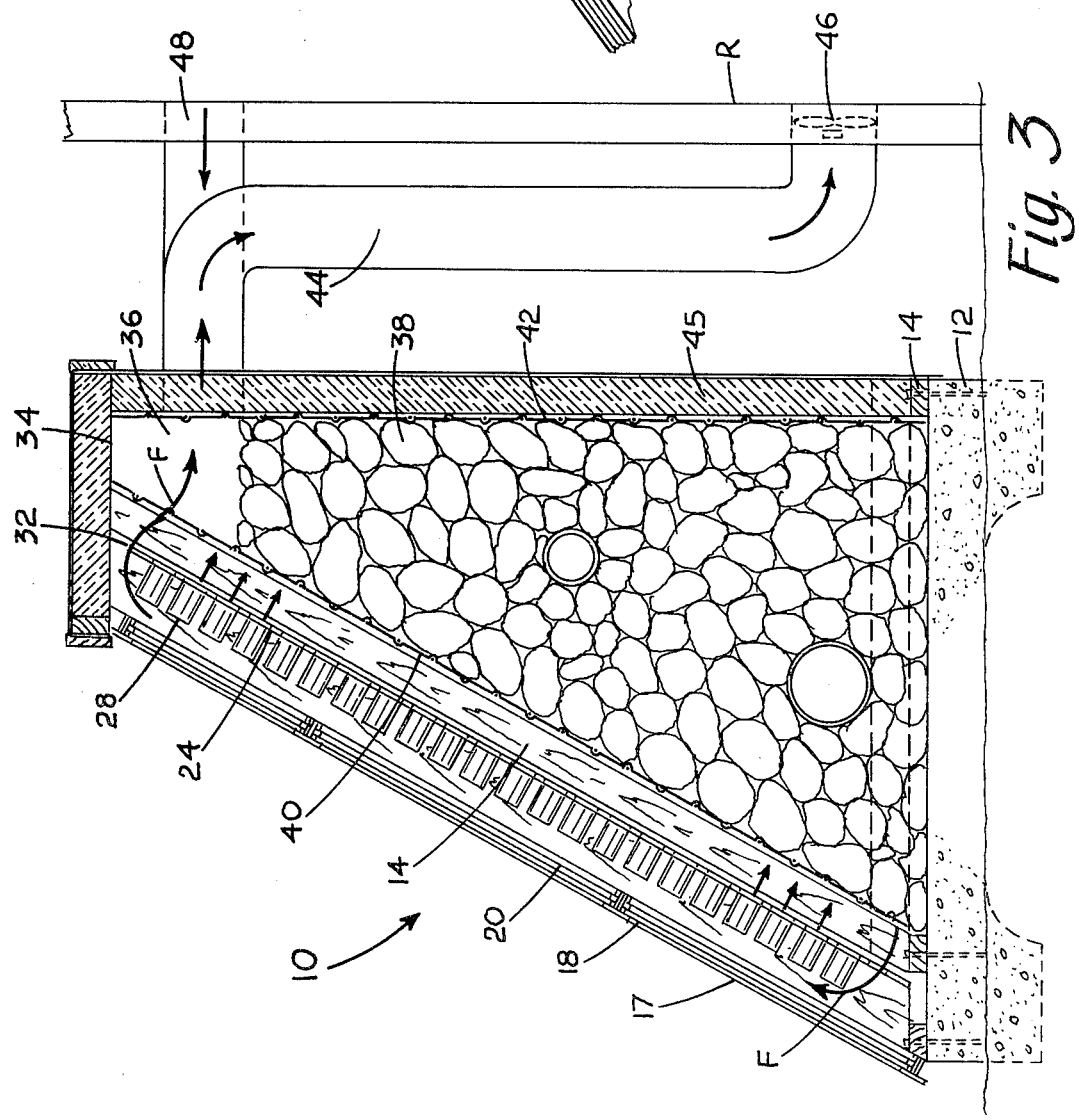
FIG. 3 is a section view of the system.

It will be noted that the bottom row of holes 26 are left open and the same may be repeated with one of the top rows or, as shown in FIG. 3 the top edge 32 of the collector panel may terminate short of the insulated ceiling 34. In any event, openings are provided at the top and bottom to enable circulation of air in the space between collector panel 24 and the front panel 17 from behind the collector panel 24 at the bottom to exit at the top as indicated by the arrows F.

Disposed behind the collector panel 24 is a heat storage chamber 36 in which a pile of heat absorbing stones 38 are confined between wire screens 40 and 42. It will be apparent that, in operation, relatively cool air is drawn off at the bottom of the rock pile 38 to pass upward along the collector panel 24 and over and around the beverage cans 28 to be heated by the heat, absorbent surfaces thereof and enter back into the heat storing chamber 36 at the top. At the same time, the heated beverage cans 28 radiate heat directly into the rockpile 38 from their metallic lids 30 greatly to elevate the level of heat within the heat storage chamber 36.

Figure 5:
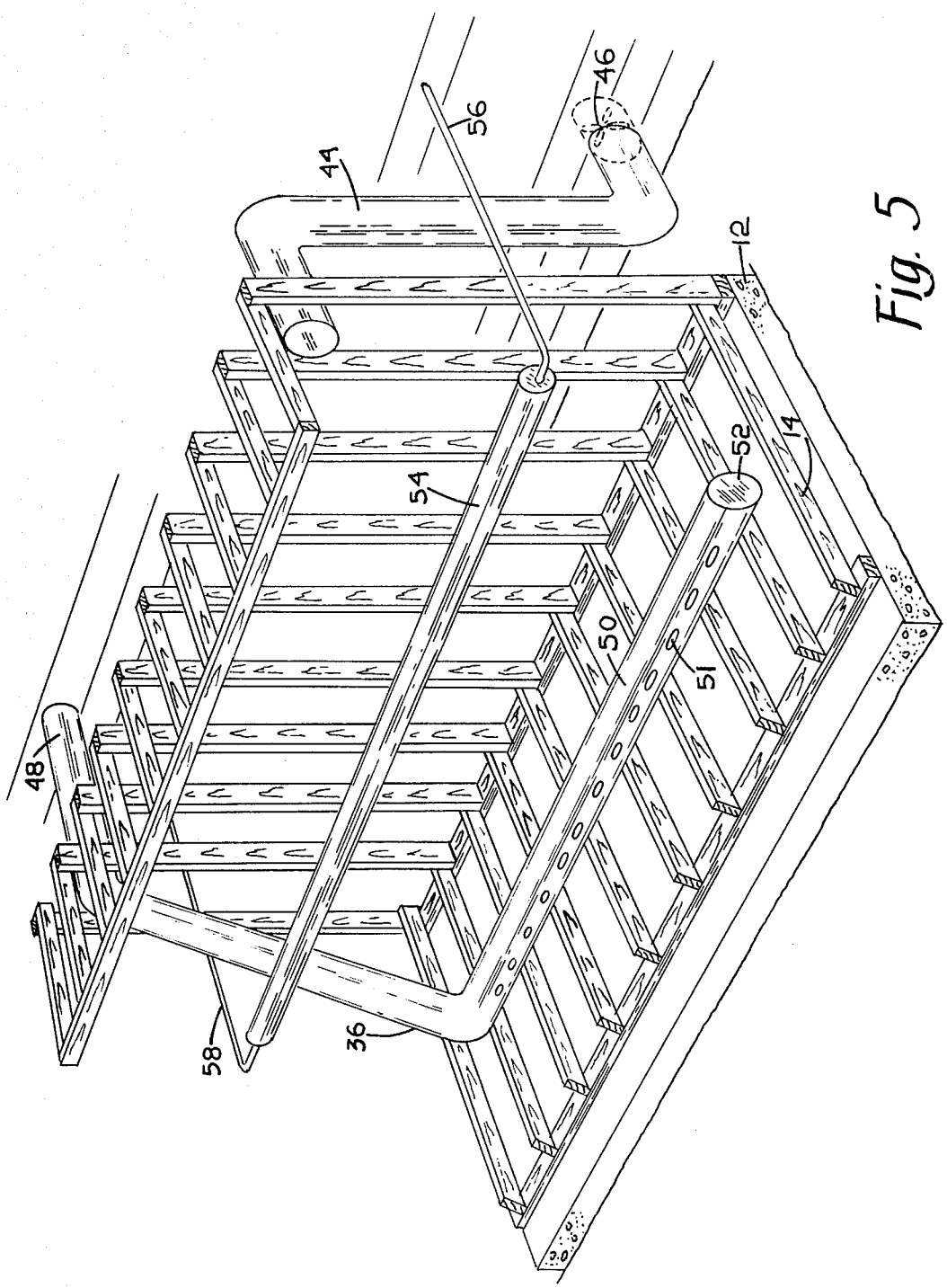
FIG. 5 is an isometric view of the framing and piping embodying features of this invention.

As seen most clearly in FIGS. 3 and 5 a hot air duct 44 opens through the insulated rear panel 45 from near the top of the heat retaining chamber 36 to enter into the room R to be heated. A small fan 46 is provided in the heating duct 44 to deliver a stream of warm air from the solar heating system 10.

A return duct 48 opens into the heat storage chamber 36 at the same level as the heating duct 44 exits, and then as shown in FIG. 5, the return duct drops down to the lower level of the heat storage chamber and then connects to an horizontal run 50 along the lower level of the heat storage chamber. Of course, horizontal run 50 is of a more rugged construction and material to withstand the load of rocks 38 disposed thereon.

In operation, the fan 46 will draw warm air from the top level of the heat storage chamber 36 to deliver it to the room R and the return air will enter through duct 38 to exit through a series of openings 51 along the length of the pipe 50 for maximum distribution across the pile of rocks. Preferably the holes 51 are along both front and back of the pipe 50, and the end 52 is capped. From the lower level of the heat storage chamber 36 the air exiting through the holes 51 is again circulated to the heating system as above described. Since the return duct 48 enters the heat storage chamber 36 at the same level as the heating duct 44, there will be no circulation of air and, hence, no heating of the room R when the fan is turned off.

Also if desired, the heating system 10 of this invention may be used to heat water and, for this purpose, a relatively large pipe 54 slopes upwardly from right to left in FIG. 5 with smaller cold 56 and hot 58 water pipes being connected at the ends. Again, with the pipe 54 sloping upwardly the water is heated by the rocks 38 and the warmer water rises naturally to circulate out at 58.

While this invention has been described in conjunction with a preferred embodiment thereof, it is obvious that modifications and changes therein may be made by those skilled in the art without departing from the spirit and scope of this invention as defined by the claims appended hereto.

Having described my invention, I claim:

1. A solar heating system comprising:
    a collector panel having a front side adapted for exposure to solar radiation and a back side;
    a heat absorbing coating on said front side;
    a plurality of circular openings through said panels;
    a plurality of hollow metallic cylinders in said openings with most of the lengths thereof extending upward from said front side;
    end closures on said cylinders on the end exposed from said front side;
    heat absorbing coatings on the outer surfaces of said end closures and exterior portions of said cylinders exposed from said front side; and
    top closures with reflective surfaces on at least some of said cylinders exposed through the back side of said panel;
    wherein said panel is part of an enclosure and including an accumulation of materials having heat retaining characteristics in said inclosure rearward of the back side of said panel;
    whereby, said cylinders radiate heat directly to said materials.

2. The solar heating system defined by claim 1 including:
    through openings at the top and bottom of said panel to enable flow of cooler air from said back side to the front side of the bottom to flow upward across said front side and said cylinders and then, after being warmed, flow to the back side of the top of said panel.

3. The solar heating system defined by claim 1 including:
    a pair of parallel transparent sheets spaced generally parallel to and above the front side of said panel to enable passage of solar rays but with an air space between them to insulate against outward passage of heat.

4. The solar heating system defined by claim 1 including:
    a heating duct from the top of said enclosure to the lower portion on of a room being heated; and
    a return duct from the upper portion of said room being heated to the upper portion of said enclosure at the level of said heating duct.

* * * * *